(12) United States Patent
Luo et al.

(10) Patent No.: US 12,625,249 B2
(45) Date of Patent: May 12, 2026

(54) VEHICULAR RADAR SYSTEM WITH ENHANCED WAVEGUIDE AND ANTENNA

(71) Applicant: Magna Electronics Inc., Auburn Hills, MI (US)

(72) Inventors: Yi Luo, Northville, MI (US); Sujith Gurram, Orion Township, MI (US); Suresh Boddi, New Hudson, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 320 days.

(21) Appl. No.: 18/484,678

(22) Filed: Oct. 11, 2023

(65) Prior Publication Data

US 2024/0125913 A1 Apr. 18, 2024

Related U.S. Application Data

(60) Provisional application No. 63/379,335, filed on Oct. 13, 2022.

(51) Int. Cl.
*G01S 13/60* (2006.01)
*G01S 13/90* (2006.01)

(52) U.S. Cl.
CPC ............ *G01S 13/60* (2013.01); *G01S 13/904* (2019.05)

(58) Field of Classification Search
CPC ......... G01S 13/931; G01S 2013/93271; G01S 2013/93275; G01S 7/032; G01S 2013/93272; G01S 7/03; G01S 13/325; G01S 13/87; G01S 7/023; G01S 7/0233; G01S 7/0234; G01S 13/878; G01S 7/4026; G01S 13/34; G01S 2013/9321; G01S 7/027; G01S 7/403; G01S 13/003; G01S 13/04; G01S 13/36; G01S 13/93; G01S 2013/9316; G01S 7/4021; G01S 7/4034; G01S 13/42; H01Q 1/3233; H01Q 1/3283; H01Q 21/065; H01Q 1/36; H01Q 13/10; H01Q 1/2283; H01Q 1/3275; H01Q 13/02
See application file for complete search history.

(56) References Cited

U.S. PATENT DOCUMENTS

| | | | |
|---|---|---|---|
| 6,587,186 B2 | 7/2003 | Bamji et al. | |
| 6,674,895 B2 | 1/2004 | Rafii et al. | |
| 6,678,039 B2 | 1/2004 | Charbon | |
| 6,690,354 B2 | 2/2004 | Sze | |
| 6,710,770 B2 | 3/2004 | Tomasi et al. | |
| 6,876,775 B2 | 4/2005 | Torunoglu | |
| 6,906,793 B2 | 6/2005 | Bamji et al. | |

(Continued)

*Primary Examiner* — Lincoln D Donovan
*Assistant Examiner* — Tyler J Pereny
(74) *Attorney, Agent, or Firm* — HONIGMAN LLP

(57) ABSTRACT

A vehicular radar sensing system includes a radar sensor that includes a radiation slot sheet, a wave port sheet, and a waveguide sheet sandwiched between the radiation slot sheet and the wave port sheet. The sheets are joined together. The radiation slot sheet includes at least one transmitter that transmits radio signals and at least one receiver that receives radio signals. The waveguide sheet guides the transmitted radio signals from the radiation slot sheet to the wave port sheet and guides reflected radio signals from the wave port sheet to the radiation slot sheet. The transmitted radio signals are provided to the environment via at least one wave port of the wave point sheet. The reflected radio signals are received from the environment at the at least one wave port.

22 Claims, 2 Drawing Sheets

(56)                    References Cited

U.S. PATENT DOCUMENTS

| | | | |
|---|---|---|---|
| 6,919,549 | B2 | 7/2005 | Bamji et al. |
| 7,053,357 | B2 | 5/2006 | Schwarte |
| 7,157,685 | B2 | 1/2007 | Bamji et al. |
| 7,176,438 | B2 | 2/2007 | Bamji et al. |
| 7,203,356 | B2 | 4/2007 | Gokturk et al. |
| 7,212,663 | B2 | 5/2007 | Tomasi |
| 7,283,213 | B2 | 10/2007 | O'Connor et al. |
| 7,310,431 | B2 | 12/2007 | Gokturk et al. |
| 7,321,111 | B2 | 1/2008 | Bamji et al. |
| 7,340,077 | B2 | 3/2008 | Gokturk et al. |
| 7,352,454 | B2 | 4/2008 | Bamji et al. |
| 7,375,803 | B1 | 5/2008 | Bamji |
| 7,379,100 | B2 | 5/2008 | Gokturk et al. |
| 7,379,163 | B2 | 5/2008 | Rafii et al. |
| 7,405,812 | B1 | 7/2008 | Bamji |
| 7,408,627 | B2 | 8/2008 | Bamji et al. |
| 8,013,780 | B2 | 9/2011 | Lynam |
| 8,027,029 | B2 | 9/2011 | Lu et al. |
| 9,036,026 | B2 | 5/2015 | Dellantoni et al. |
| 9,146,898 | B2 | 9/2015 | Ihlenburg et al. |
| 9,575,160 | B1 | 2/2017 | Davis et al. |
| 9,599,702 | B1 | 3/2017 | Bordes et al. |
| 9,689,967 | B1 | 6/2017 | Stark et al. |
| 9,753,121 | B1 | 9/2017 | Davis et al. |
| 9,869,762 | B1 | 1/2018 | Alland et al. |
| 9,954,955 | B2 | 4/2018 | Davis et al. |
| 10,186,787 | B1 * | 1/2019 | Wang ................... H01Q 21/005 |
| 10,866,306 | B2 | 12/2020 | Maher et al. |
| 11,294,028 | B2 | 4/2022 | Gentili et al. |
| 11,454,719 | B2 | 9/2022 | Hess et al. |
| 11,454,720 | B2 * | 9/2022 | Hess ................... H01Q 21/065 |
| 12,013,480 | B2 | 6/2024 | Hess et al. |
| 12,058,804 | B2 * | 8/2024 | Brandenburg ......... H01Q 1/002 |
| 2010/0245066 | A1 | 9/2010 | Sarioglu et al. |
| 2012/0050125 | A1 | 3/2012 | Leiba et al. |
| 2015/0346322 | A1 | 12/2015 | Schmalenberg et al. |
| 2017/0222311 | A1 | 8/2017 | Hess et al. |
| 2017/0254873 | A1 | 9/2017 | Koravadi |
| 2017/0276788 | A1 | 9/2017 | Wodrich |
| 2017/0315231 | A1 | 11/2017 | Wodrich |
| 2017/0356994 | A1 | 12/2017 | Wodrich et al. |
| 2018/0015875 | A1 | 1/2018 | May et al. |
| 2018/0045812 | A1 | 2/2018 | Hess |
| 2018/0231635 | A1 | 8/2018 | Woehlte |
| 2019/0124238 | A1 | 4/2019 | Byrne et al. |
| 2019/0124243 | A1 | 4/2019 | Mleczko et al. |
| 2019/0306966 | A1 | 10/2019 | Byrne et al. |
| 2019/0339382 | A1 | 11/2019 | Hess et al. |
| 2019/0348746 | A1 | 11/2019 | Gupta et al. |
| 2020/0001787 | A1 | 1/2020 | Lu et al. |
| 2020/0033549 | A1 | 1/2020 | Liu et al. |
| 2020/0137926 | A1 | 4/2020 | Wohlte |
| 2020/0166637 | A1 | 5/2020 | Hess et al. |
| 2020/0235453 | A1 * | 7/2020 | Lang ..................... H05K 1/181 |
| 2023/0035968 | A1 | 2/2023 | Wodrich et al. |
| 2023/0305142 | A1 | 9/2023 | Bui-Van et al. |

* cited by examiner

VEHICULAR RADAR SYSTEM WITH ENHANCED WAVEGUIDE AND ANTENNA

CROSS REFERENCE TO RELATED APPLICATION

The present application claims the filing benefits of U.S. provisional application Ser. No. 63/379,335, filed Oct. 13, 2022, which is hereby incorporated herein by reference in its entirety.

FIELD OF THE INVENTION

The present invention relates generally to a vehicle sensing system for a vehicle and, more particularly, to a vehicle sensing system that utilizes one or more radar sensors at a vehicle.

BACKGROUND OF THE INVENTION

Use of radar sensors in vehicle sensing systems is common and known. Examples of such known systems are described in U.S. Pat. Nos. 9,146,898; 8,027,029 and/or 8,013,780, which are hereby incorporated herein by reference in their entireties.

SUMMARY OF THE INVENTION

A vehicular radar sensing system includes a radar sensor disposed at a vehicle. The radar sensor includes a printed circuit board (PCB). The PCB includes at least one transmitter that transmits radio signals and at least one receiver that receives radio signals. The radar sensor includes a radio frequency (RF) antenna array including a plurality of sheets, and the plurality of sheets includes (i) a radiation slot sheet, (ii) a waveguide sheet and (iii) a wave port sheet. The waveguide sheet is sandwiched between the radiation slot sheet and the wave port sheet. Individual sheets of the plurality of sheets are joined together. The radiation slot sheet includes (i) at least one transmitter aperture that receives first radio signals from the at least one transmitter and provides the first radio signals to the waveguide sheet and (ii) at least one receiver aperture that receives second radio signals from the waveguide sheet and provides the second radio signals to the at least one receiver. The waveguide sheet includes a plurality of waveguide slots that includes (i) at least one first waveguide slot that guides the first radio signals from the radiation slot sheet to the wave port sheet and (ii) at least one second waveguide slot that guides the second radio signals from the wave port sheet to the radiation slot sheet. The wave port sheet includes a plurality of wave ports and at least one first wave port of the plurality of wave ports receives the first radio signals from the at least one first waveguide slot of the waveguide sheet and guides the first radio signals to the environment. At least one second wave port of the plurality of wave ports receives the second radio signals from the environment and guides the second radio signals to the at least one second waveguide slot of the waveguide sheet.

These and other objects, advantages, purposes and features of the present invention will become apparent upon review of the following specification in conjunction with the drawings.

DESCRIPTION OF THE PREFERRED EMBODIMENTS

A vehicle sensing system and/or driver or driving assist system and/or object detection system and/or alert system operates to capture sensor data representative of the exterior of the vehicle and may process the captured sensor data to detect objects at or near the vehicle and in the predicted path of the vehicle, such as to assist a driver of the vehicle in maneuvering the vehicle in a rearward direction. The sensing system includes a data processor or data processing system that is operable to receive sensor data from one or more sensors (e.g., radar sensors) to detect objects for one or more assistance systems of the vehicle.

Figure 1:
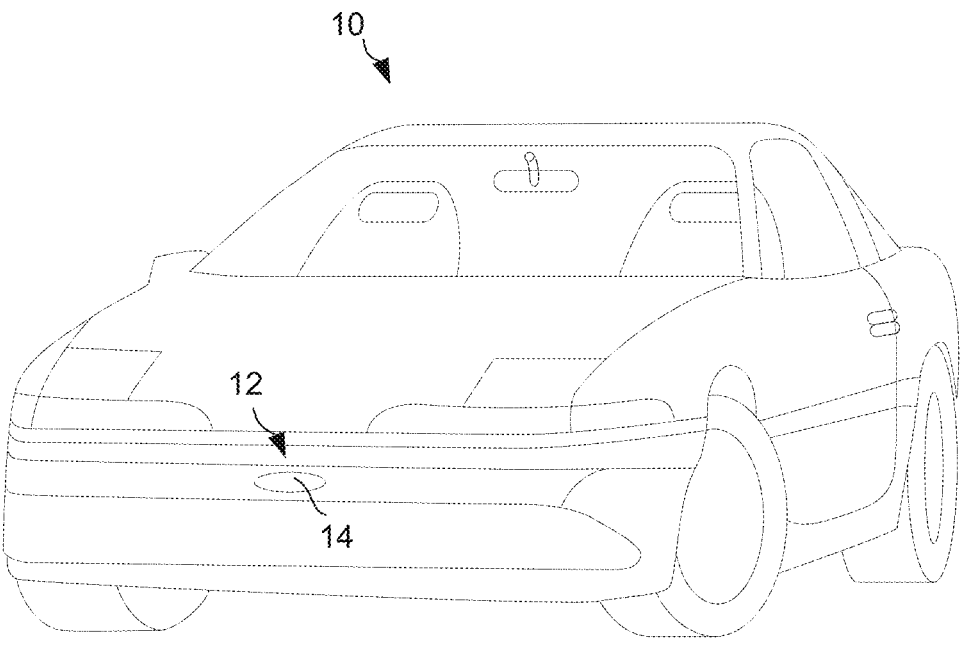
FIG. 1 is a perspective view of a vehicle with a sensing system that incorporates a radar sensor.

Referring now to the drawings and the illustrative embodiments depicted therein, a vehicle 10 (FIG. 1) includes an driving assistance system or sensing system 12 that includes at least one radar sensor unit, such as a forward facing radar sensor unit 14 (and the system may optionally include multiple exterior facing sensors, such as cameras, radar, or other sensors, such as a rearward facing sensor at the rear of the vehicle, and a sideward/rearward facing sensor at respective sides of the vehicle), which sense regions exterior of the vehicle. The sensing system 12 includes a control or electronic control unit (ECU) that includes a data processor that is operable to process data captured by the radar sensor(s). The sensing system may also include a radar sensor that includes one or more transmitters that transmit radio signals via a plurality of antennas. The radar sensor also includes one or more receivers that receive radio signals via the plurality of antennas. The received radio signals are transmitted radio signals that are reflected from an object. The ECU or processor is operable to process the received radio signals to sense or detect the object that the received radio signals reflected from. The ECU or sensing system 12 may be part of a driving assist system of the vehicle, with the driving assist system controlling at least one function or feature of the vehicle (such as to provide autonomous driving control of the vehicle) responsive to processing of the data captured by the radar sensors. The data transfer or signal communication from the sensor to the ECU may comprise any suitable data or communication link, such as a vehicle network bus or the like of the equipped vehicle.

Radar applications such as millimeter wave radar (i.e., radar sensors operating in the 30 to 300 GHz frequency domain) usually incorporate one or more antenna arrays with various elements that may include patch antennas, substrate integrated waveguide (SIW) slot antennas, and/or plastic waveguide slot antennas. While each different design may have unique advantages and disadvantages, it is a challenge to optimize the design cycle, cost, performance, and manufacturing goals simultaneously due to the number of different variables. Often, the entire antenna design must be redesigned for each new use case (e.g., for a different vehicle, a different location on the same vehicle, etc.).

Figure 2:
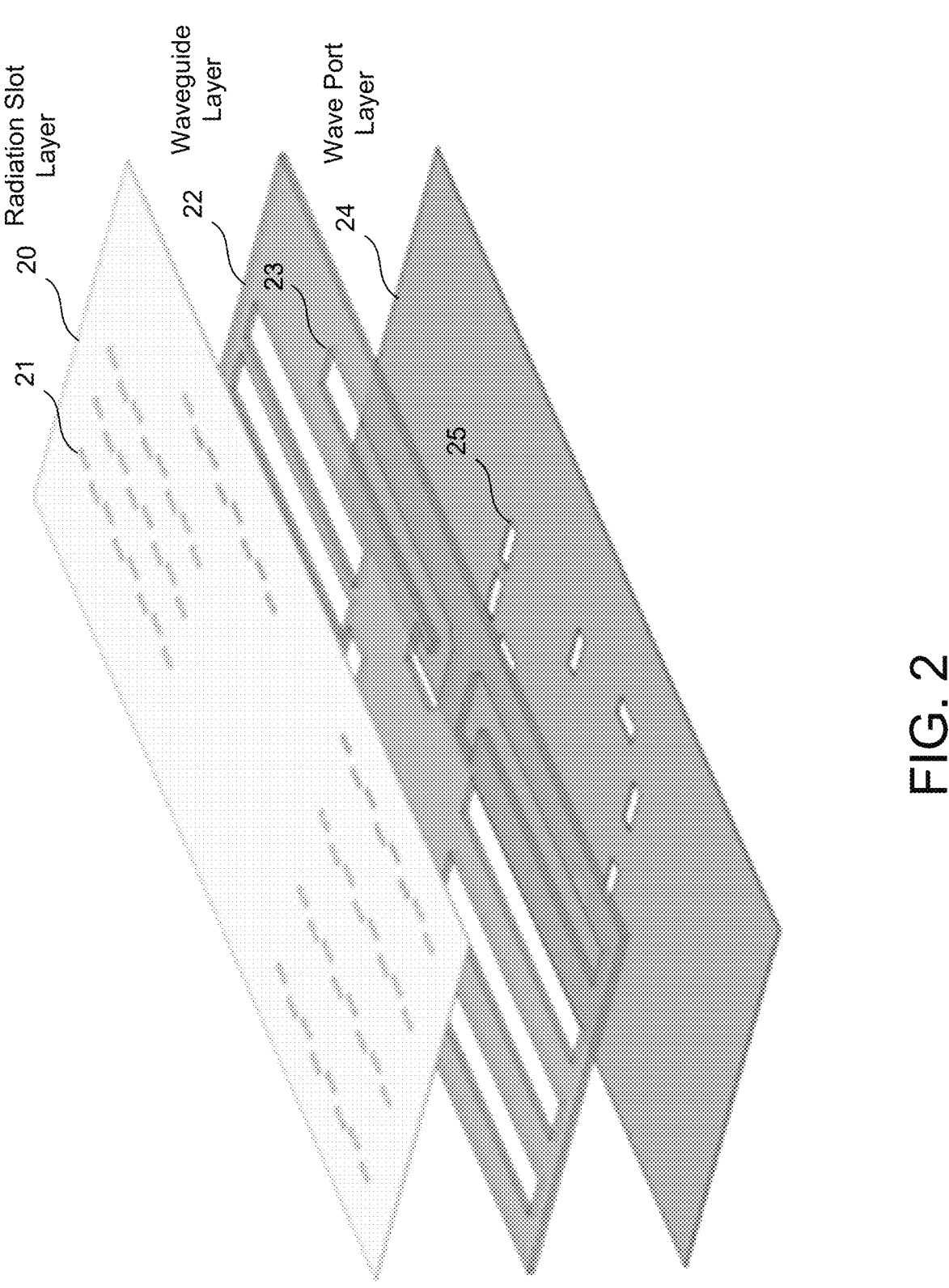
FIG. 2 is a perspective view of a plurality of layers of a radar module of the sensing system of FIG. 1.

Implementations herein include an antenna module that simplifies optimizing a radar system for multiple design goals simultaneously. As illustrated in FIG. 2, the antenna module includes an antenna design with multiple separate elements or layers or sheets (e.g., three or more sheet metal layers). For example, a first layer or sheet includes a radiation slot layer 20, a second layer or sheet includes a waveguide layer 22, and a third layer or sheet includes a wave port layer 24. In this example, the second layer 22 separates the first layer 20 and the third layer 24. The radiation slot layer may include one or more apertures 21 that transmit (i.e., transmit apertures 21) and receive (i.e., receive apertures 21) radio signals to/from a processor (e.g., an ECU). For example, transmitter/receivers disposed on a printed circuit board (PCB) may be aligned or juxtaposed with the apertures 21 to guide radio signals from the PCB to the radiation slot layer 20 and vice versa. The waveguide layer 22 may include one or more waveguides or waveguide slots 23 that guide the transmitted radio signals from the transmitting apertures 21 at the radiation slot layer to the wave port layer 22. The waveguides 23 may also guide the received radio signals from the wave port layer 22 to the receiving apertures 21 at the radiation slot layer 20. The wave port layer 24 may include one or more wave ports 25 that emit the transmitted radio signals to the external environment and that receive the reflected radio signals from the external environment. The wave port layer 24 restricts the radio signals from passing through the wave port layer 24 at points other than the wave ports 25 (e.g., via a metallic coating or composition of the wave port layer 24).

The one or more wave ports 25 are configured to transmit, to the external environment, radio signals received by the apertures 21 of the radiation slot layer 20 and receive, from the external environment, radio signals in a manner consistent with the design and performance objectives of the radar module. For example, the one or more wave ports 25 are configured to cause the radar sensor to have a field of sensing of a particular size or orientation. That is, the size, location, quantity, and orientation of the wave ports 25 may adjust various parameters of the performance of the radar sensor. Thus, the radiation slot layer 20 includes apertures 21 that receive transmitted radio signals from the processor PCB or other control, the waveguide layer 22 includes one or more waveguides 23 to guide the radio signals from the apertures 21 of the radiation slot layer 20 to the wave ports 25 of the wave port layer 24, and the wave port 24 layer includes the one or more wave ports 25 to radiate the radar signals into the external environment. Similarly, received signals (i.e., transmitted signals reflecting off an object in the environment) are received at the wave ports 25 and travel to the receiving apertures 21 to the PCB or other receiver. While the example of FIG. 2 includes three layers, additional layers may also be included, such as multiple waveguide layers or wave port layers.

Each layer may be individually or independently fabricated, such as independently laser cut, stamped, and/or machined, and/or via any other process to form the respective layer. After each layer is fabricated or formed (e.g., after each layer is independently cut, chemical/photo etched, stamped, machined, etc.), the antenna module is assembled in part by stacking/fastening/joining each layer together. The layers may be fastened or joined in a variety of ways. For example, the layers may be fastened using electrically conductive adhesive or other type of adhesive, welding, clamp features and/or any other fastening methods. When fastened, the layers are arranged such that the slots 23 of the waveguide layer 22 correspond or are aligned or juxtaposed with the apertures 21 at the radiation slot layer 20 and the wave ports 25 at the wave port layer 24, so that the radio signals are communicated between the apertures 21 and the wave ports 25. For example, the radiation slot layer 20 includes apertures 21 arranged in multiple rows and/or columns.

The waveguide layer 22 includes one or more cutouts 23, slots, etc. that overlay the apertures 21 of the radiation slot layer 20 (i.e., waveguides 23). The wave port layer 24 includes one or more wave ports 25 (i.e., apertures in the wave port layer). The waveguides 23 of the waveguide layer 22 overlay the wave ports 25, such that radio signals from the apertures 21 of the radiation slot layer 20 are propagated along the waveguides 23 of the waveguide layer 22 (bounded by the edges of the cutouts 23 and substrates or other portions of the radiation slot layer 20 and the wave port layer 24) to the wave ports 25 of the wave port layer 24 and radio signals from the environment are propagated from the wave ports 25, along the waveguides 23, to the apertures 21.

Thus, the radar module provides a modular antenna design that allows a radar designer designing a particular radar design to make changes to only the layers necessary while reusing other layers (e.g., using common or universal layers) that need not be changed for the particular design. For example, when the radar design only changes the radiation slot layer 20 (and not the waveguide layer 22 or the wave port layer 24) due to, for example, change to the underlying PCB, or when the radar designer only changes the waveguide layer 22 (and not the radiation slot layer 20 or the wave port layer 24), or when the radar designer only changes the wave port layer 24 (and not the radiation slot layer 20 or the waveguide layer 22), the radar designer may more easily design for different radar fields of sensing and/or performance without having to account for the design decisions and optimizations of the other layers.

The radar sensor or sensors may be disposed at the vehicle so as to sense exterior of the vehicle. For example, the radar sensor may comprise a front sensing radar sensor mounted at a grille or front bumper of the vehicle, such as for use with an automatic emergency braking system of the vehicle, an adaptive cruise control system of the vehicle, a collision avoidance system of the vehicle, etc., or the radar sensor may be comprise a corner radar sensor disposed at a front corner or rear corner of the vehicle, such as for use with a surround vision system of the vehicle, or the radar sensor may comprise a blind spot monitoring radars disposed at a rear fender of the vehicle for monitoring sideward/rearward of the vehicle for a blind spot monitoring and alert system of the vehicle. Optionally, the radar sensor or sensors may be disposed within the vehicle so as to sense interior of the vehicle, such as for use with a cabin monitoring system of the vehicle or a driver monitoring system of the vehicle or an occupant detection or monitoring system of the vehicle. The radar sensing system may comprise multiple input multiple output (MIMO) radar sensors having multiple transmitting antennas and multiple receiving antennas.

The system utilizes radar sensors or imaging radar sensors or lidar sensors or the like, to detect presence of and/or range to objects and/or other vehicles and/or pedestrians. The sensing system may utilize aspects of the systems described in U.S. Pat. Nos. 11,454,720; 10,866,306; 9,954,955; 9,869, 762; 9,753,121; 9,689,967; 9,599,702; 9,575,160; 9,146, 898; 9,036,026; 8,027,029; 8,013,780; 7,408,627; 7,405, 812; 7,379,163; 7,379,100; 7,375,803; 7,352,454; 7,340, 077; 7,321,111; 7,310,431; 7,283,213; 7,212,663; 7,203, 356; 7,176,438; 7,157,685; 7,053,357; 6,919,549; 6,906, 793; 6,876,775; 6,710,770; 6,690,354; 6,678,039; 6,674,895 and/or 6,587,186, and/or U.S. Publication Nos. US-2021-0382135; US-2019-0339382; US-2018-0231635; US-2018-0045812; US-2018-0015875; US-2017-0356994; US-2017-0315231; US-2017-0276788; US-2017-0254873; US-2017-0222311 and/or US-2010-0245066, which are hereby incorporated herein by reference in their entireties.

The radar sensors of the sensing system each comprise a plurality of transmitters that transmit radio signals via a plurality of antennas, a plurality of receivers that receive radio signals via the plurality of antennas, with the received radio signals being transmitted radio signals that are reflected from an object present in the field of sensing of the respective radar sensor. The system includes an ECU or control that includes a data processor for processing sensor data captured by the radar sensors. The ECU or sensing system may be part of a driving assist system of the vehicle, with the driving assist system controlling at least one function or feature of the vehicle (such as to provide autonomous driving control of the vehicle) responsive to processing of the data captured by the radar sensors.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular radar sensing system, the vehicular radar sensing system comprising:

a radar sensor disposed at a vehicle;

wherein the radar sensor comprises a printed circuit board (PCB);

wherein the PCB comprises at least one transmitter that transmits radio signals and at least one receiver that receives radio signals;

wherein the radar sensor comprises a radio frequency (RF) antenna array comprising a plurality of sheets, and wherein the plurality of sheets comprises (i) a radiation slot sheet, (ii) a waveguide sheet and (iii) a wave port sheet;

wherein the waveguide sheet is sandwiched between the radiation slot sheet and the wave port sheet;

wherein individual sheets of the plurality of sheets are joined together;

wherein the radiation slot sheet comprises (i) at least one transmitter aperture that receives first radio signals from the at least one transmitter and provides the first radio signals to the waveguide sheet and (ii) at least one receiver aperture that receives second radio signals from the waveguide sheet and provides the second radio signals to the at least one receiver;

wherein the waveguide sheet comprises a plurality of waveguide slots that includes (i) at least one first waveguide slot that guides the first radio signals from the radiation slot sheet to the wave port sheet and (ii) at least one second waveguide slot that guides the second radio signals from the wave port sheet to the radiation slot sheet; and wherein the wave port sheet comprises a plurality of wave ports, and wherein at least one first wave port of the plurality of wave ports receives the first radio signals from the at least one first waveguide slot of the waveguide sheet and guides the first radio signals to an external environment, and wherein at least one second wave port of the plurality of wave ports receives the second radio signals from the external environment and guides the second radio signals to the at least one second waveguide slot of the waveguide sheet; and wherein the at least one transmitter comprises a plurality of transmitters, and wherein the at least one transmitter aperture comprises a plurality of transmitter aperture, and wherein each transmitter of the plurality of transmitters aligns with a respective transmitter aperture of the plurality of transmitter apertures.

2. The vehicular radar sensing system of claim 1, wherein at least one sheet of the plurality of sheets comprises a metallic sheet.

3. The vehicular radar sensing system of claim 2, wherein each sheet of the plurality of sheets comprises a respective metallic sheet.

4. The vehicular radar sensing system of claim 1, wherein the individual sheets of the plurality of sheets are joined together via electrically conductive adhesive.

5. The vehicular radar sensing system of claim 1, wherein the individual sheets of the plurality of sheets are joined together via welding.

6. The vehicular radar sensing system of claim 1, wherein the radar sensor comprises a millimeter wave radar sensor.

7. The vehicular radar sensing system of claim 1, wherein each sheet of the plurality of sheets is independently fabricated.

8. A vehicular radar sensing system, the vehicular radar sensing system comprising:

a radar sensor disposed at a vehicle;

wherein the radar sensor comprises a printed circuit board (PCB);

wherein the PCB comprises at least one transmitter that transmits radio signals and at least one receiver that receives radio signals;

wherein the radar sensor comprises a radio frequency (RF) antenna array comprising a plurality of sheets, and wherein the plurality of sheets comprises (i) a radiation slot sheet, (ii) a waveguide sheet and (iii) a wave port sheet;

wherein the waveguide sheet is sandwiched between the radiation slot sheet and the wave port sheet;

wherein individual sheets of the plurality of sheets are joined together;

wherein the radiation slot sheet comprises (i) at least one transmitter aperture that receives first radio signals from the at least one transmitter and provides the first radio signals to the waveguide sheet and (ii) at least one receiver aperture that receives second radio signals from the waveguide sheet and provides the second radio signals to the at least one receiver;

wherein the waveguide sheet comprises a plurality of waveguide slots that includes (i) at least one first waveguide slot that guides the first radio signals from the radiation slot sheet to the wave port sheet and (ii) at least one second waveguide slot that guides the second radio signals from the wave port sheet to the radiation slot sheet; wherein the wave port sheet comprises a plurality of wave ports, and wherein at least one first wave port of the plurality of wave ports receives the first radio signals from the at least one first waveguide slot of the waveguide sheet and guides the first radio signals to an external environment, and wherein at least one second wave port of the plurality of wave ports receives the second radio signals from the external environment and guides the second radio signals to the at least one second waveguide slot of the waveguide sheet; and wherein the at least one receiver comprises a plurality of receivers, and wherein each receiver of the plurality of receivers aligns with a respective receiver aperture of the at least one receiver aperture.

9. The vehicular radar sensing system of claim 1, wherein the waveguide sheet comprises at least one waveguide, and wherein the at least one waveguide (i) guides the first radio signals from the at least one transmitter aperture to the plurality of wave ports and (ii) guides the second radio signals from the plurality of wave ports to the at least one receiver aperture.

10. The vehicular radar sensing system of claim 1, wherein the PCB comprises a processor operable to process radio signals transmitted by the at least one transmitter and received by the at least one receiver.

11. The vehicular radar sensing system of claim 1, wherein the radiation slot sheet is closer to the PCB than the wave port sheet.

12. The vehicular radar sensing system of claim 1, wherein joining of the plurality of sheets together comprises adhering a rear side of the radiation slot sheet to a front side of the waveguide sheet and adhering a rear side of the waveguide sheet to a front side of the wave port sheet.

13. The vehicular radar sensing system of claim 1, wherein, with the waveguide sheet sandwiched between the radiation slot sheet and the wave port sheet, the at least one transmitter aperture of the radiation slot sheet juxtaposes the at least one first waveguide slot of the waveguide sheet.

14. The vehicular radar sensing system of claim 13, wherein the at least one first waveguide slot of the waveguide sheet juxtaposes the at least one first wave port of the wave port sheet.

15. The vehicular radar sensing system of claim 14, wherein the at least one receiver aperture of the radiation slot sheet juxtaposes the at least one second waveguide slot of the waveguide sheet, and wherein the at least one second waveguide slot of the waveguide sheet juxtaposes the at least one second wave port of the wave port sheet.

16. A vehicular radar sensing system, the vehicular radar sensing system comprising:

a millimeter radar sensor disposed at a vehicle;

wherein the millimeter radar sensor comprises a printed circuit board (PCB);

wherein the PCB comprises at least one transmitter that transmits radio signals and at least one receiver that receives radio signals;

wherein the millimeter radar sensor comprises a radio frequency (RF) antenna array comprising a plurality of sheets, and wherein the plurality of sheets comprises (i) a radiation slot sheet, (ii) a waveguide sheet and (iii) a wave port sheet;

wherein the waveguide sheet is sandwiched between the radiation slot sheet and the wave port sheet;

wherein individual sheets of the plurality of sheets are joined together;

wherein the radiation slot sheet comprises (i) at least one transmitter aperture that receives first radio signals from the at least one transmitter and provides the first radio signals to the waveguide sheet and (ii) at least one receiver aperture that receives second radio signals from the waveguide sheet and provides the second radio signals to the at least one receiver;

wherein the waveguide sheet comprises a plurality of waveguide slots, and wherein, with the waveguide sheet sandwiched between the radiation slot sheet and the wave port sheet, (i) the at least one transmitter aperture of the radiation slot sheet juxtaposes at least one first waveguide slot of the plurality of waveguide slots and (ii) the at least one receiver aperture of the radiation slot sheet juxtaposes at least one second waveguide slot of the plurality of waveguide slots;

wherein the wave port sheet comprises a plurality of wave ports, and wherein, with the waveguide sheet sandwiched between the radiation slot sheet and the wave port sheet, (i) at least one first wave port of the plurality of wave ports juxtaposes the at least one first waveguide slot of the waveguide sheet and (ii) at least one second wave port of the plurality of wave ports juxtaposes the at least one second waveguide slot of the waveguide sheet; and wherein the at least one transmitter comprises a plurality of transmitters, and wherein the at least one transmitter aperture comprises a plurality of transmitter aperture, and wherein each transmitter of the plurality of transmitters aligns with a respective transmitter aperture of the plurality of transmitter apertures.

17. The vehicular radar sensing system of claim 16, wherein at least one sheet of the plurality of sheets comprises a metallic sheet.

18. The vehicular radar sensing system of claim 17, wherein each sheet of the plurality of sheets comprises a respective metallic sheet.

19. The vehicular radar sensing system of claim 16, wherein the individual sheets of the plurality of sheets are joined together via electrically conductive adhesive.

20. A vehicular radar sensing system, the vehicular radar sensing system comprising:

a millimeter radar sensor disposed at a vehicle;

wherein the millimeter radar sensor comprises a printed circuit board (PCB);

wherein the PCB comprises at least one transmitter that transmits radio signals and at least one receiver that receives radio signals;

wherein the millimeter radar sensor comprises a radio frequency (RF) antenna array comprising a plurality of sheets, and wherein the plurality of sheets comprises (i) a radiation slot sheet, (ii) a waveguide sheet and (iii) a wave port sheet;

wherein the waveguide sheet is sandwiched between the radiation slot sheet and the wave port sheet, and wherein the radiation slot sheet is closer to the PCB than the wave port sheet;

wherein each sheet of the plurality of sheets is independently fabricated, and wherein individual sheets of the plurality of sheets are joined together after being independently fabricated;

wherein the radiation slot sheet comprises (i) at least one transmitter aperture that receives first radio signals from the at least one transmitter and provides the first radio signals to the waveguide sheet and (ii) at least one receiver aperture that receives second radio signals from the waveguide sheet and provides the second radio signals to the at least one receiver;

wherein the waveguide sheet comprises a plurality of waveguide slots that includes (i) at least one first waveguide slot that guides the first radio signals from the radiation slot sheet to the wave port sheet and (ii) at least one second waveguide slot that guides the second radio signals from the wave port sheet to the radiation slot sheet;

wherein the wave port sheet comprises a plurality of wave ports, and wherein at least one first wave port of the plurality of wave ports receives the first radio signals from the at least one first waveguide slot of the waveguide sheet and guides the first radio signals to an environment, and wherein at least one second wave port of the plurality of wave ports receives the second radio signals from the environment and guides the second radio signals to the at least one second waveguide slot of the waveguide sheet; and wherein the at least one transmitter comprises a plurality of transmitters, and wherein the at least one transmitter aperture comprises a plurality of transmitter aperture, and wherein each transmitter of the plurality of transmitters aligns with a respective transmitter aperture of the plurality of transmitter apertures.

21. The vehicular radar sensing system of claim 20, wherein the at least one receiver comprises a plurality of receivers, and wherein each receiver of the plurality of receivers aligns with a respective receiver aperture of the at least one receiver aperture.

22. The vehicular radar sensing system of claim 20, wherein the waveguide sheet comprises at least one waveguide, and wherein the at least one waveguide (i) guides the first radio signals from the at least one transmitter aperture to the plurality of wave ports and (ii) guides the second radio signals from the plurality of wave ports to the at least one receiver aperture.

\* \* \* \* \*